(12) United States Patent
Creed (10) Patent No.: US 12,430,248 B2
(45) Date of Patent: Sep. 30, 2025

(54) BOARD LEVEL DYNAMIC CACHE LAYOUT DISTRIBUTION

(71) Applicant: Dell Products L.P., Round Rock, TX (US)

(72) Inventor: John Creed, Innishannon (IE)

(73) Assignee: Dell Products L.P., Round Rock, TX (US)

( * ) Notice: Subject to any disclaimer, the term of this patent is extended or adjusted under 35 U.S.C. 154(b) by 83 days.

(21) Appl. No.: 18/386,673

(22) Filed: Nov. 3, 2023

(65) Prior Publication Data

US 2025/0147882 A1 May 8, 2025

(51) Int. Cl.
*G06F 12/08* (2016.01)
*G06F 12/0802* (2016.01)

(52) U.S. Cl.
CPC .............................. *G06F 12/0802* (2013.01)

(58) Field of Classification Search
CPC .................................................. G06F 12/0802
See application file for complete search history.

(56) References Cited

U.S. PATENT DOCUMENTS

2003/0191916 A1\* 10/2003 McBrearty .......... G06F 11/1464
711/112
2005/0071599 A1\* 3/2005 Modha .................... G06F 12/12
711/170

\* cited by examiner

*Primary Examiner* — Jae U Yu
(74) *Attorney, Agent, or Firm* — Krishnendu Gupta; Nikhil Patel (57) ABSTRACT

One or more aspects of the present disclosure relate to cache layout optimization. In embodiments, an input/output (IO) workload is received by a storage array. Additionally, a system-level cache layout distribution model is established based on one or more characteristics of the IO workload. Further, cache slot allocations are dynamically adjusted for each cache segment of global memory for each board based on the system-level cache layout distribution model and the one or more characteristics of the IO workload.

20 Claims, 5 Drawing Sheets

BOARD LEVEL DYNAMIC CACHE LAYOUT DISTRIBUTION

BACKGROUND

A storage array performs block-based, file-based, or object-based storage services. Rather than store data on a server, storage arrays can include multiple storage devices (e.g., drives) to store vast amounts of data. For example, a financial institution can use storage arrays to collect and store financial transactions from local banks and automated teller machines (ATMs) related to, e.g., bank account deposits/withdrawals. In addition, storage arrays can include a central management system (CMS) that manages the data and delivers one or more distributed storage services for an organization. The central management system can include one or more processors that perform data storage services.

SUMMARY

One or more aspects of the present disclosure relate to board-level dynamic cache layout distribution. In embodiments, an input/output (IO) workload is received by a storage array. Additionally, a system-level cache layout distribution model is established based on one or more characteristics of the IO workload. Further, cache slot allocations are dynamically adjusted for each cache segment of global memory for each board based on the system-level cache layout distribution model and the one or more characteristics of the IO workload.

In embodiments, the global memory can be divided into one or more cache segments.

In embodiments, a cache slot size corresponding to each cache segment can be established.

In embodiments, a first portion of the global memory can be allocated for mirrored cache segments. Additionally, a second portion of the global memory can be allocated for unmirrored cache segments.

In embodiments, the IO workload can be analyzed. Further, the one or more characteristics of the IO workload can be identified based on the analysis.

In embodiments, one or more of an IO type, IO size, IO pattern, IO sequence, and IOs per second (IOPS) corresponding to the IO workload can be determined.

In embodiments, one or more IO workload models can be established based on the one or more characteristics of one or more historical IO workloads.

In embodiments, cache slot allocations can be dynamically adjusted for each cache segment of the global memory based on the one or more IO workload models.

In embodiments, cache slot allocations of one or more subject cache segments of the global memory can be increased based on the one or more IO workload models.

In embodiments, cache slot allocations of one or more subject cache segments of the global memory can be decreased based on the one or more IO workload models.

Other technical features may be readily apparent to one skilled in the art from the following figures, descriptions, and claims.

BRIEF DESCRIPTION OF THE DRAWINGS

The preceding and other objects, features, and advantages will be apparent from the following more particular description of the embodiments, as illustrated in the accompanying drawings. Like reference, characters refer to the same parts throughout the different views. The drawings are not necessarily to scale, emphasis instead being placed upon illustrating the embodiments' principles.

DETAILED DESCRIPTION

A business like a financial or technology corporation can produce large amounts of data and require sharing access to that data among several employees. Such a business often uses storage arrays to store and manage the data. Because a storage array can include multiple storage devices (e.g., hard-disk drives (HDDs) or solid-state drives (SSDs)), the business can scale (e.g., increase or decrease) and manage an array's storage capacity more efficiently than a server. In addition, the business can use a storage array to read/write data required by one or more business applications.

Figure 1:
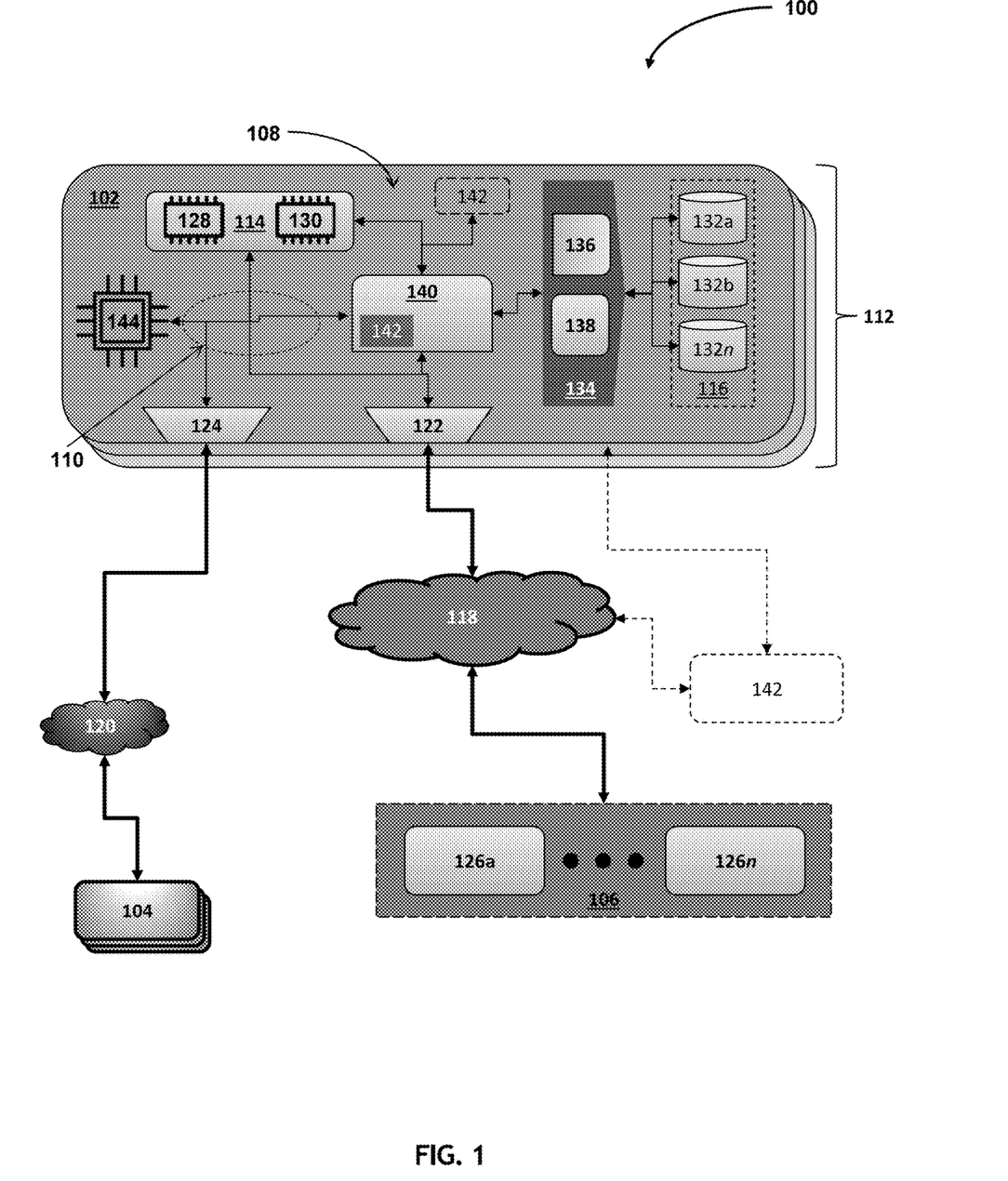
FIG. 1 illustrates a distributed network environment in accordance with embodiments of the present disclosure.

Regarding FIG. 1, a distributed network environment 100 can include a storage array 102, a remote system 104, and hosts 106. In embodiments, the storage array 102 can include components 108 that perform one or more distributed file storage services. In addition, the storage array 102 can include one or more internal communication channels 110 like Fibre channels, busses, and communication modules that communicatively couple the components 108. Further, the distributed network environment 100 can define an array cluster 112, including the storage array 102 and one or more other storage arrays.

In embodiments, the storage array 102, components 108, and remote system 104 can include a variety of proprietary or commercially available single or multi-processor systems (e.g., parallel processor systems). Single or multi-processor systems can include central processing units (CPUs), graphical processing units (GPUs), and the like. Additionally, the storage array 102, remote system 104, and hosts 106 can virtualize one or more of their respective physical computing resources (e.g., processors (not shown), memory 114, and persistent storage 116).

In embodiments, the storage array 102 and, e.g., one or more hosts 106 (e.g., networked devices) can establish a network 118. Similarly, the storage array 102 and a remote system 104 can establish a remote network 120. Further, the network 118 or the remote network 120 can have a network architecture that enables networked devices to send/receive electronic communications using a communications protocol. For example, the network architecture can define a storage area network (SAN), local area network (LAN), wide area network (WAN) (e.g., the Internet), an Explicit Congestion Notification (ECN), Enabled Ethernet network, and the like. Additionally, the communications protocol can include a Remote Direct Memory Access (RDMA), TCP, IP, TCP/IP protocol, SCSI, Fibre Channel, Remote Direct Memory Access (RDMA) over Converged Ethernet (ROCE) protocol, Internet Small Computer Systems Interface (iSCSI) protocol, NVMe-over-fabrics protocol (e.g., NVMe-over-ROCEv2 and NVMe-over-TCP), and the like.

Further, the storage array 102 can connect to the network 118 or remote network 120 using one or more network interfaces. The network interface can include a wired/wireless connection interface, bus, data link, and the like. For example, a host adapter (HA 122), e.g., a Fibre Channel Adapter (FA) and the like, can connect the storage array 102 to the network 118 (e.g., SAN). Further, the HA 122 can receive and direct IOs to one or more of the storage array's components 108, as described in greater detail herein.

Likewise, a remote adapter (RA 124) can connect the storage array 102 to the remote network 120. Further, the network 118 and remote network 120 can include communication mediums and nodes that link the networked devices. For example, communication mediums can include cables, telephone lines, radio waves, satellites, infrared light beams, etc. The communication nodes can also include switching equipment, phone lines, repeaters, multiplexers, and satellites. Further, the network 118 or remote network 120 can include a network bridge that enables cross-network communications between, e.g., the network 118 and remote network 120.

In embodiments, hosts 106 connected to the network 118 can include client machines 126a-n, running one or more applications. The applications can require one or more of the storage array's services. Accordingly, each application can send one or more input/output (IO) messages (e.g., a read/write request or other storage service-related request) to the storage array 102 over the network 118. Further, the IO messages can include metadata defining performance requirements according to a service level agreement (SLA) between hosts 106 and the storage array provider.

In embodiments, the storage array 102 can include a memory 114, such as volatile or nonvolatile memory. Further, volatile and nonvolatile memory can include random access memory (RAM), dynamic RAM (DRAM), static RAM (SRAM), and the like. Moreover, each memory type can have distinct performance characteristics (e.g., speed corresponding to reading/writing data). For instance, the types of memory can include register, shared, constant, user-defined, and the like. Furthermore, in embodiments, the memory 114 can include global memory (GM 128) that can cache IO messages and their respective data payloads. Additionally, the memory 114 can include local memory (LM 130) that stores instructions that the storage array's processors 144 can execute to perform one or more storage-related services. For example, the storage array 102 can have a multi-processor architecture that includes one or more CPUs (central processing units) and GPUs (graphical processing units).

In addition, the storage array 102 can deliver its distributed storage services using persistent storage 116. For example, the persistent storage 116 can include multiple thin-data devices (TDATs) such as persistent storage drives 132a-n. Further, each TDAT can have distinct performance capabilities (e.g., read/write speeds) like hard disk drives (HDDs) and solid-state drives (SSDs).

Further, the HA 122 can direct one or more IOs to an array component 108 based on their respective request types and metadata. In embodiments, the storage array 102 can include a device interface (DI 134) that manages access to the array's persistent storage 116. For example, the DI 134 can include a disk adapter (DA 136) (e.g., storage device controller), flash drive interface 138, and the like that control access to the array's persistent storage 116 (e.g., storage devices 132a-n).

Likewise, the storage array 102 can include an Enginuity Data Services processor (EDS 140) that can manage access to the array's memory 114. Further, the EDS 140 can perform one or more memory and storage self-optimizing operations (e.g., one or more machine learning techniques) that enable fast data access. Specifically, the operations can implement techniques that deliver performance, resource availability, data integrity services, and the like based on the SLA and the performance characteristics (e.g., read/write times) of the array's memory 114 and persistent storage 116. For example, the EDS 140 can deliver hosts 106 (e.g., client machines 126a-n) remote/distributed storage services by virtualizing the storage array's memory/storage resources (memory 114 and persistent storage 116, respectively).

In embodiments, the storage array 102 can also include a controller 142 (e.g., management system controller) that can reside externally from or within the storage array 102 and one or more of its components 108. When external from the storage array 102, the controller 142 can communicate with the storage array 102 using any known communication connections. For example, the communications connections can include a serial port, parallel port, network interface card (e.g., Ethernet), etc. Further, the controller 142 can include logic/circuitry that performs one or more storage-related services. For example, the controller 142 can have an architecture designed to manage the storage array's computing, processing, storage, and memory resources as described in greater detail herein.

Figure 2:
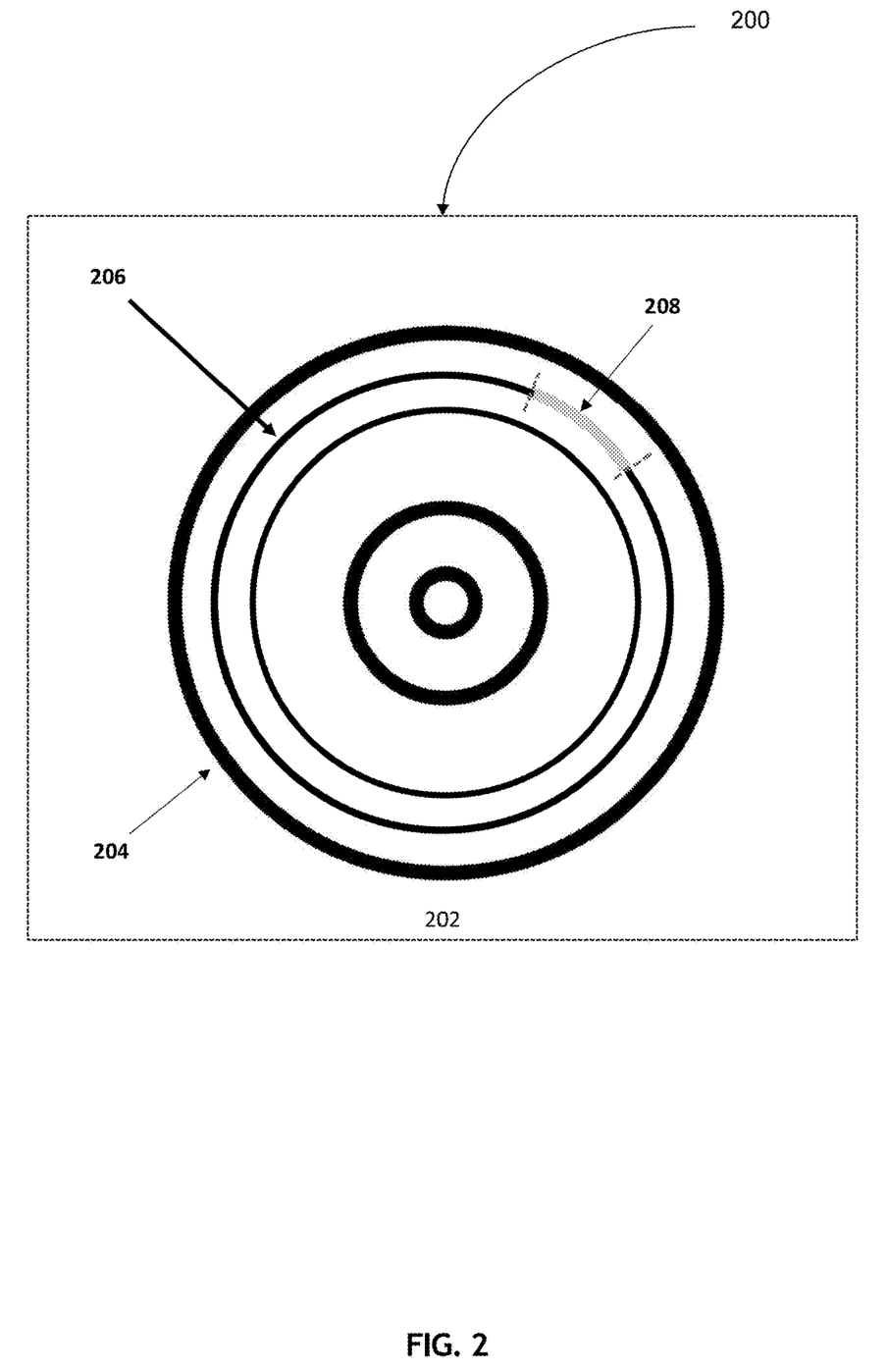
FIG. 2 is a cross-sectional view of a storage device in accordance with embodiments of the present disclosure.

Regarding FIG. 2, the storage array 102 can provide a host, e.g., client machine 126a of FIG. 1, with a logical device (e.g., virtual or thin device (TDEV)). The logical device can represent or virtualize zero or more physical address spaces from, e.g., the persistent storage 116 of FIG. 1. For example, the persistent storage 116 can include an HDD 202 with stacks of cylinders 204. Like a vinyl record's grooves, each cylinder 204 can include one or more tracks 206. Further, each track 206 can include several sectors (e.g., track slices or portions) 208. Additionally, each sector 208 can include a set of physical address blocks.

In embodiments, a data services engine (e.g., the EDS 140 of FIG. 1) can establish a logical block address (LBA) corresponding to each physical address block. Accordingly, a continuous set of LBAs can form a logical sector corresponding to a physical sector (e.g., sector 208) of a storage device 132a-n. Further, the data services engine can group several logical sectors to establish a logical track. Thus, a logical track can include physical address blocks from several storage devices 132a-n. Each logical track can also include a unique identifier (ID), e.g., a track ID (TID). Thus, the data services engine can establish a logical device with a unique device ID by logically grouping one or more logical tracks using their respective TIDs. Furthermore, the data services engine can logically group a logical device's tracks to establish one or more extents with unique extent IDs.

As stated herein, the storage devices 126 can have distinct performance capabilities. For example, an HDD architecture is known by skilled artisans to be slower than an SSD's architecture. Likewise, the array's memory 114 can include different memory types, each with distinct performance characteristics described herein. In embodiments, the EDS 108 can establish a storage or memory hierarchy based on the SLA and the performance characteristics of the array's memory/storage resources. For example, the SLA can include one or more Service Level Objectives (SLOs) specifying performance metric ranges (e.g., response times and uptimes) corresponding to the hosts' performance requirements.

Further, the SLO can specify service level (SL) tiers corresponding to each performance metric range and categories of data importance (e.g., critical, high, medium, low). For example, the SLA can map critical data types to an SL tier requiring the fastest response time. Thus, the storage array 102 can allocate the array's memory/storage resources based on an IO workload's anticipated volume of IO messages associated with each SL tier and the memory hierarchy.

For example, the EDS 108 can establish the hierarchy to include one or more tiers (e.g., subsets of the array's storage and memory) with similar performance capabilities (e.g., response times and uptimes). Thus, the EDS 108 can establish fast memory and storage tiers to service host-identified critical and valuable data (e.g., Platinum, Diamond, and Gold SLs). In contrast, slow memory and storage tiers can service host-identified, non-critical, less valuable data (e.g., Silver and Bronze SLs). The EDS 108 can also define "fast" and "slow" performance metrics based on relative performance measurements of the array's memory 114 and storage devices 126. Thus, the fast tiers can include memory 114 and storage devices 126 with relative performance capabilities exceeding a first threshold. In contrast, slower tiers can include memory 114 and storage devices 126, with relative performance capabilities falling below a second threshold. In embodiments, the first and second thresholds can have substantially similar values.

Figure 2A:
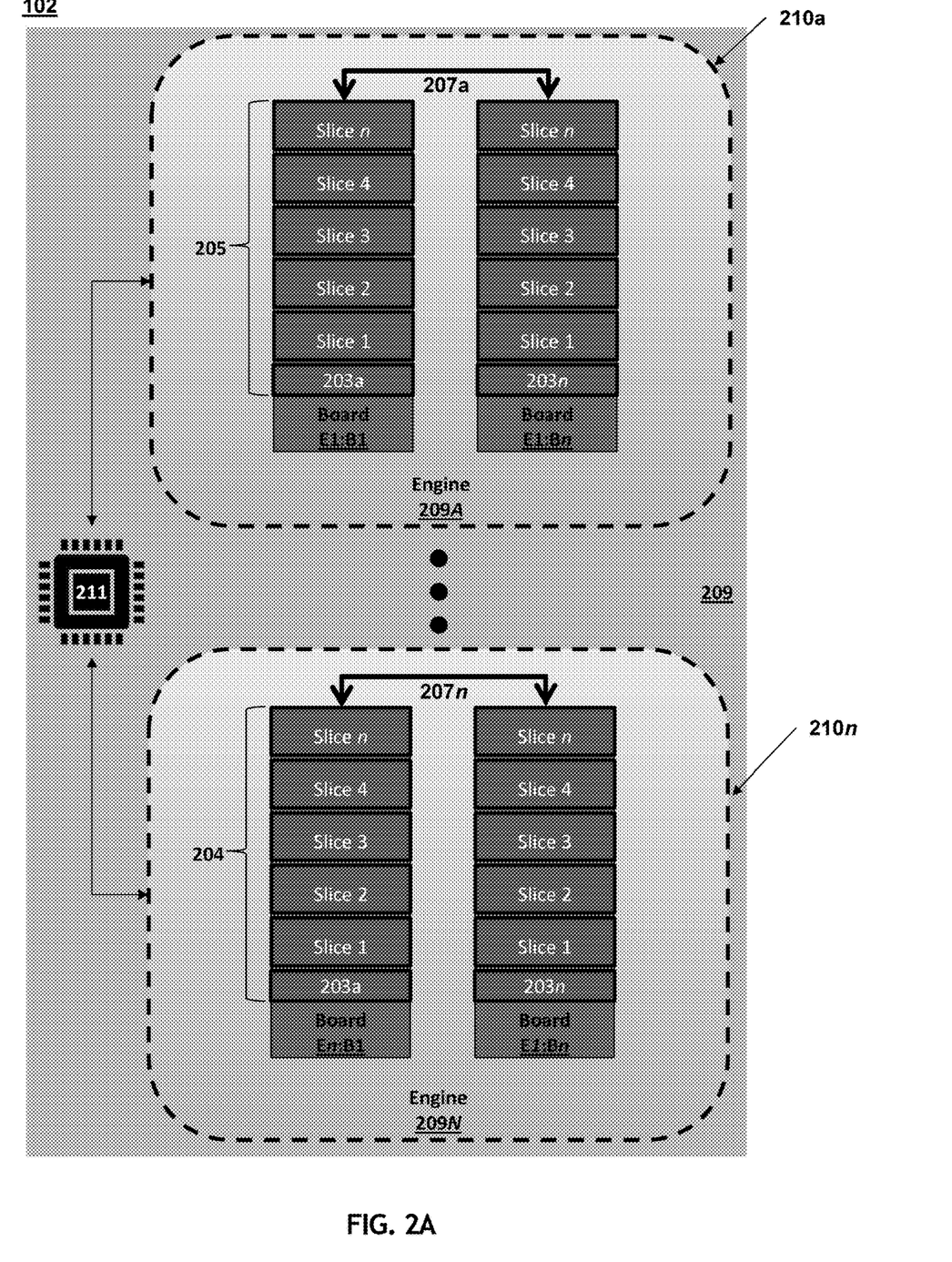
FIG. 2A is a block diagram of a storage engine in accordance with embodiments of the present disclosure.

Regarding FIG. 2A, the storage array 102 can include engines 209, including logic, circuitry, and hardware that perform storage services. For example, the storage array 102 can house each engine 209A-N in a corresponding housing 210a-n (e.g., shelves). Furthermore, each engine 209A-N can include boards (e.g., director boards) E1:B1-E1: Bn, En:B1-En: Bn that include one or more emulations of the storage array's components 108 of FIG. 1. For example, the boards E1:B1-E1:Bn, En:B1-En:Bn can include slices 1-n, each emulating one of the components 108. Further, the engines 200A-n can include corresponding shared board-level memory 207a-n. Additionally, the boards E1:B1-E1: Bn, En:B1-En:Bn can include corresponding shared slice-level memory 203a-n (e.g., DRAM). Likewise, the engines 209 can include engine-level shared memory 211, enabling boards to share memory and storage related information between boards on different engines.

Figure 3:
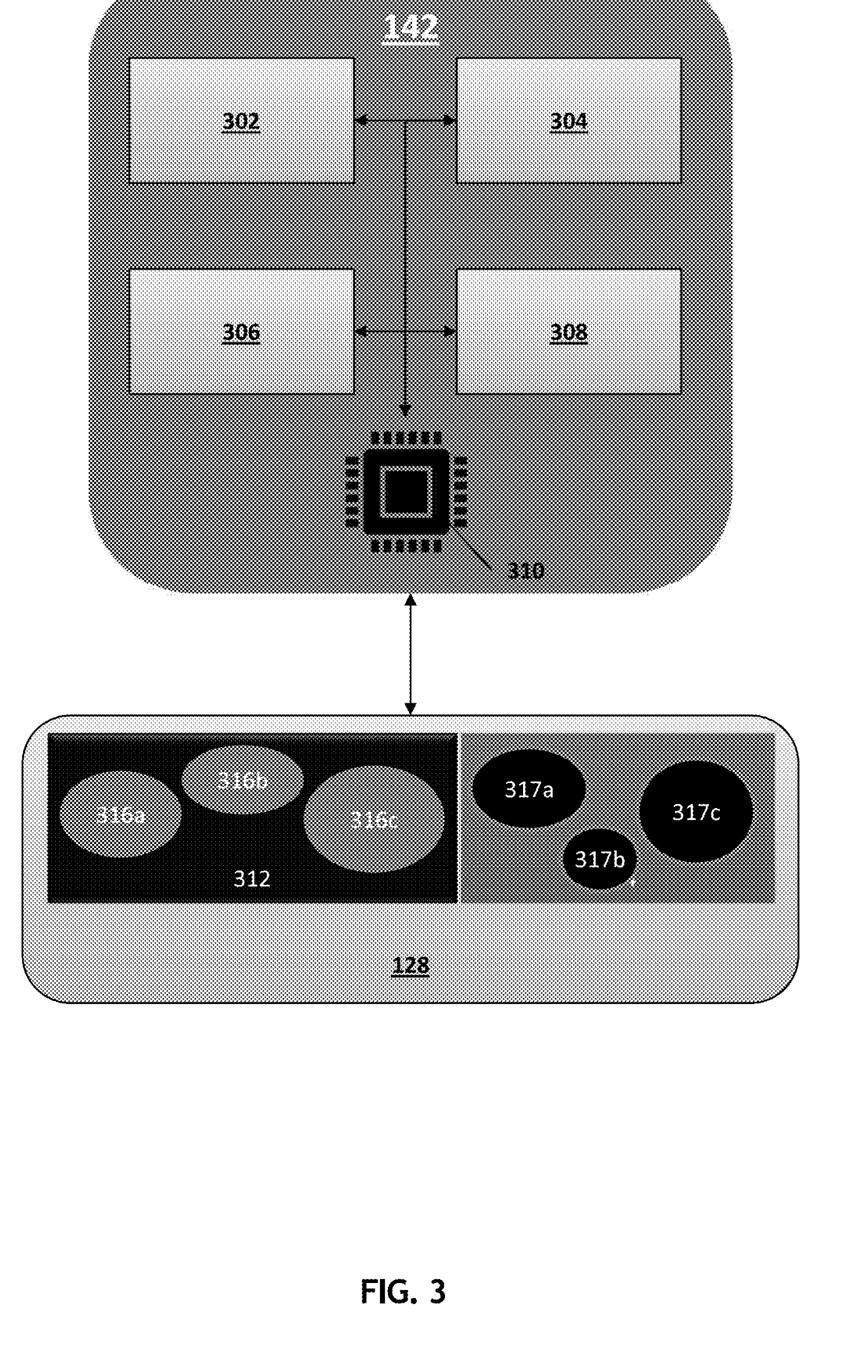
FIG. 3 is a block diagram of a controller in accordance with embodiments of the present disclosure.

Regarding FIG. 3, a storage array 102 can include a controller 142 with logic, hardware, and circuitry 300 that perform one or more data storage services. For example, the controller 142 can process an input/output (IO) workload 301 received by the storage array 102.

In embodiments, the controller 142 can in include an IO processor 302 that receives and processes the IO workload 301 and its corresponding IO messages (e.g., IO read/write requests). The IO processor 302 can process the "raw" IO messages for further analysis. For example, the IO processor 302 can extract metadata from the IO messages periodically. Additionally, time-series analysis can be performed on the metadata. Accordingly, the IO processor 302 can generate time-series signals corresponding to the IO workload 301, historical IO workloads, and their corresponding IO messages. For example, the IO processor 302 can generate a time-series signal based on the cache type and cache segments targeted by the IO messages of the IO workload 301. The cache type can be mirrored cache 312 or unmirrored cache 314. Further, the cache slot sizes can be based on the IO size of the IO messages. In embodiments, the mirrored cache 312 can include mirrored cache segments 316a-c and the unmirrored cache 314 can include unmirrored cache segments 317a-c. The mirrored cache segments 316a-c can have distinct cache slot sizes (e.g., 16 KB, 64 KB, and 128 KB). Additionally, the unmirrored cache segments 317a-c can have distinct cache slot sizes (e.g., 32 KB, 64 KB, and 128 KB).

In embodiments, the controller 142 can include an IO analyzer 304 that monitors and analyzes the IO workload 301 and its corresponding IO messages (e.g., IO read/write requests). For example, the IO analyzer 304 can determine the IO characteristics of the IO workload 301 and its IO messages using metadata from IO messages. The characteristics include IO type, size, read/write ratio, access patterns, etc. Further, the IO analyzer 304 can identify patterns in IO characteristics using the metadata from current and historical IO workloads and their corresponding IO messages. For example, the IO analyzer 304 can include logic, hardware, and circuitry (not shown) with a neural self-learning learning architecture that processes the current and historical IO metadata. In a local memory 310 and using the patterns, the IO analyzer 304 can maintain IO workload models defining IO characteristics of one or more anticipated IO workloads and their corresponding IO messages. Accordingly, the IO workload models can predict access rates corresponding to logical devices and their corresponding tracks targeted by IO messages of anticipated IO workloads. In embodiments, the IO models can further identify boards (e.g., boards E1:B1-E1:Bn, En:B1-En:Bn of FIG. 2A) targeted by IO messages. For example, each IO message of an IO workload can include metadata corresponding to a destination port (not shown) corresponding to a subject director board.

In embodiments, the controller 142 can include a cache layout forecaster 306 that processes the IO messages, IO workload models, and their corresponding characteristics to generate one or more cache layout models. For example, the cache layout forecaster 306 can process the time-series signals generated by the IO processor 302 using a holt-winters forecasting technique. In response to processing the time-series signals, cache layout forecaster 306 can generate cache layout models corresponding to one or more of the IO workload models. The cache layout model can define the sizes of the first portion (e.g., mirrored cache 312) and the second portion (e.g., unmirrored cache 314) of global memory 128. Further, the cache layout model can define a quantity of cache slots that a should be allocated to each of the cache segments 316a-c, 317a-c of the mirrored and unmirrored cache partitions 312, 314.

For example, the cache layout forecaster 306 can processes the time-series signals to generate system-level cache layout distribution models. The system-level cache layout distribution model can define a global-level distribution of the sizes of the first portion (e.g., mirrored cache 312) and the second portion (e.g., unmirrored cache 314) of global memory 128. Additionally, the system-level cache layout distribution model can define a global-level quantify of cache slots that a should be allocated to each of the cache segments 316a-c, 317a-c of the mirrored and unmirrored cache partitions 312, 314.

Further, the cache layout forecaster 306 can process the time-series signals to generate board-level cache layout distribution models. Specifically, the board-level cache layout distribution model can define a board-level distribution of the sizes of the first portion (e.g., mirrored cache 312) and the second portion (e.g., unmirrored cache 314) of board memory (e.g., memory 203a-n). Additionally, the board-level cache layout distribution model can define a board-level quantify of cache slots that a should be allocated to each of the cache segments 316a-c, 317a-c of the mirrored and unmirrored cache partitions 312, 314 of board memory. Further, the board-level distribution models can satisfy requirements of corresponding system-level cache layout distribution models. In other words, the aggregate cache layouts of each board must satisfy the global layout.

In embodiments, the controller 142 can include a cache controller 308 configured to dynamically adjust the sizes of the first and second portions 312, 314 of the global memory 128 and board-level memory (e.g., memory 203a-n) based on the system and board level cache layout models. Further, the cache controller 308 can dynamically increase or decrease cache slot allocations for each cache segment 316a-c, 317a-c of the first and second portions 312, 314 of global memory 128 and board-level memory. Specifically, the cache controller 308 can map a current IO workload received by the storage array 102 to an IO workload model. Using the IO workload model, the cache controller 308 can identify a corresponding system and board level cache layout models via, e.g., a look-up table stored in local memory 310.

The following text includes details of a method(s) or a flow diagram(s) per embodiments of this disclosure. For simplicity of explanation, each method is depicted and described as a set of alterable operations. Additionally, one or more operations can be performed in parallel, concurrently, or in a different sequence. Further, not all the illustrated operations are required to implement each method described by this disclosure.

Figure 4:
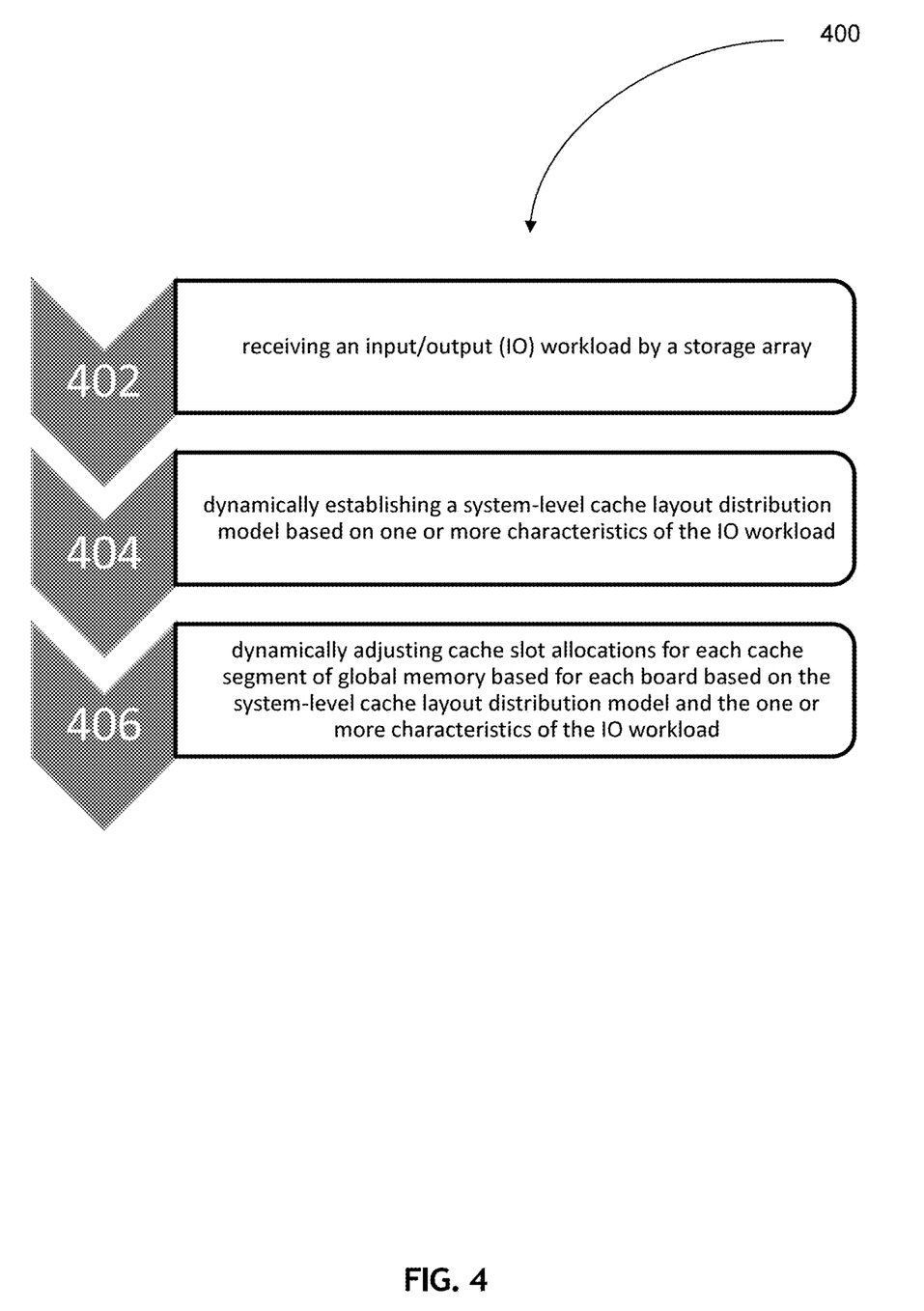
FIG. 4 is a flow diagram of a method for board-level dynamic cache layout distribution per embodiments of the present disclosure.

Regarding FIG. 4, a method 400 relates to board-level dynamic cache layout distribution. In embodiments, the controller 142 of FIG. 1 can perform all or a subset of operations corresponding to the method 400.

For example, the method 400, at 402, can include receiving an input/output (IO) workload by a storage array. Additionally, at 404, the method 400 can include dynamically adjusting cache slot allocations for each cache segment of global memory based on one or more characteristics of the IO workload.

Further, each operation can include any combination of techniques implemented by the embodiments described herein. Additionally, one or more of the storage array's components 108 can implement one or more of the operations of each method described above.

Using the teachings disclosed herein, a skilled artisan can implement the above-described systems and methods in digital electronic circuitry, computer hardware, firmware, or software. The implementation can be a computer program product. Additionally, the implementation can include a machine-readable storage device for execution by or to control the operation of a data processing apparatus. The implementation can, for example, be a programmable processor, a computer, or multiple computers.

A computer program can be in any programming language, including compiled or interpreted languages. The computer program can have any deployed form, including a stand-alone program, subroutine, element, or other units suitable for a computing environment. One or more computers can execute a deployed computer program.

One or more programmable processors can perform the method steps by executing a computer program to perform the concepts described herein by operating on input data and generating output. An apparatus can also perform the method steps. The apparatus can be a special-purpose logic circuitry. For example, the circuitry is an FPGA (field-programmable gate array) or an ASIC (application-specific integrated circuit). Subroutines and software agents can refer to portions of the computer program, the processor, the special circuitry, software, or hardware that implements that functionality.

Processors suitable for executing a computer program include, by way of example, both general and special purpose microprocessors and any one or more processors of any digital computer. A processor can receive instructions and data from a read-only memory, a random-access memory, or both. Thus, for example, a computer's essential elements are a processor for executing instructions and one or more memory devices for storing instructions and data. Additionally, a computer can receive data from or transfer data to one or more mass storage device(s) for storing data (e.g., magnetic, magneto-optical disks, solid-state drives (SSDs, or optical disks).

Data transmission and instructions can also occur over a communications network. Information carriers that embody computer program instructions and data include all nonvolatile memory forms, including semiconductor memory devices. The information carriers can, for example, be EPROM, EEPROM, flash memory devices, magnetic disks, internal hard disks, removable disks, magneto-optical disks, CD-ROM, or DVD-ROM disks. In addition, the processor and the memory can be supplemented by or incorporated into special-purpose logic circuitry.

A computer with a display device enabling user interaction can implement the above-described techniques, such as a display, keyboard, mouse, or any other input/output peripheral. The display device can, for example, be a cathode ray tube (CRT) or a liquid crystal display (LCD) monitor. The user can provide input to the computer (e.g., interact with a user interface element). In addition, other kinds of devices can enable user interaction. Other devices can, for example, be feedback provided to the user in any form of sensory feedback (e.g., visual feedback, auditory feedback, or tactile feedback). For example, input from the user can be in any form, including acoustic, speech, or tactile input.

A distributed computing system with a back-end component can also implement the above-described techniques. The back-end component can, for example, be a data server, a middleware component, or an application server. Further, a distributing computing system with a front-end component can implement the above-described techniques. The front-end component can, for example, be a client computer having a graphical user interface, a Web browser through which a user can interact with an example implementation or other graphical user interfaces for a transmitting device. Finally, the system's components can interconnect using any form or medium of digital data communication (e.g., a communication network). Examples of communication network(s) include a local area network (LAN), a wide area network (WAN), the Internet, a wired network(s), or a wireless network(s).

The system can include a client(s) and server(s). The client and server (e.g., a remote server) can interact through a communication network. For example, a client-and-server relationship can arise by computer programs running on the respective computers and having a client-server relationship. Further, the system can include a storage array(s) that delivers distributed storage services to the client(s) or server(s).

Packet-based network(s) can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network(s), 802.16 network(s), general packet radio service (GPRS) network, HiperLAN), or other packet-based networks. Circuit-based network(s) can include, for example, a public switched telephone network (PSTN), a private branch exchange (PBX), a wireless network, or other circuit-based networks. Finally, wireless network(s) can include RAN, Bluetooth, code-division multiple access (CDMA) networks, time division multiple access (TDMA) networks, and global systems for mobile communications (GSM) networks.

The transmitting device can include, for example, a computer, a computer with a browser device, a telephone, an IP phone, a mobile device (e.g., cellular phone, personal digital assistant (PDA) device, laptop computer, electronic mail device), or other communication devices. The browser device includes, for example, a computer (e.g., desktop computer, laptop computer) with a world wide web browser (e.g., Microsoft® Internet Explorer® and Mozilla®). The mobile computing device includes, for example, a Blackberry®.

Comprise, include, or plural forms of each are open-ended, include the listed parts, and contain additional unlisted elements. Unless explicitly disclaimed, the term 'or' is open-ended and includes one or more of the listed parts, items, elements, and combinations thereof.

What is claimed is:

1. A method comprising:
receiving an input/output (IO) workload by a storage array;
dynamically establishing a system-level cache layout distribution model based on one or more characteristics of the IO workload, wherein the system-level cache layout distribution model defines a global-level distribution of sizes of mirrored cache and unmirrored cache portions of global memory and defines a global-level quantity of cache slots allocated to cache segments of the mirrored and unmirrored cache portions; and
dynamically adjusting cache slot allocations for each cache segment of global memory for each board based on the system-level cache layout distribution model and the one or more characteristics of the IO workload, wherein adjusting the cache slot allocations comprises setting board-level distributions of the mirrored and unmirrored cache portions and setting board-level quantities of cache slots allocated to the cache segments to satisfy requirements of the system-level cache layout distribution model.

2. The method of claim 1, further comprising:
dividing the global memory into one or more cache segments.

3. The method of claim 2, further comprising:
establishing a cache slot size corresponding to each cache segment.

4. The method of claim 3, further comprising:
allocating a first portion of the global memory for mirrored cache segments; and
allocating a second portion of the global memory for unmirrored cache segments.

5. The method of claim 4, further comprising:
analyzing the IO workload; and
identifying the one or more characteristics of the IO workload based on the analysis.

6. The method of claim 5, further comprising:
determining one or more of an IO type, IO size, IO pattern, IO sequence, and IOs per second (IOPS) corresponding to the IO workload.

7. The method of claim 6, further comprising:
establishing one or more IO workload models based on the one or more characteristics of one or more historical IO workloads.

8. The method of claim 7, further comprising:
dynamically adjusting cache slot allocations for each cache segment of the global memory based on the one or more IO workload models.

9. The method of claim 7, further comprising:
increasing cache slot allocations of one or more subject cache segments of the global memory based on the one or more IO workload models.

10. The method of claim 7, further comprising:
decreasing cache slot allocations of one or more subject cache segments of the global memory based on the one or more IO workload models.

11. An apparatus with a memory and processor, the apparatus configured to:
receive an input/output (IO) workload by a storage array;
dynamically establish a system-level cache layout distribution model based on one or more characteristics of the IO workload, wherein the system-level cache layout distribution model defines a global-level distribution of sizes of mirrored cache and unmirrored cache portions of global memory and defines a global-level quantity of cache slots allocated to cache segments of the mirrored and unmirrored cache portions; and
dynamically adjust cache slot allocations for each cache segment of global memory based for each board based on the system-level cache layout distribution model and the one or more characteristics of the IO workload, wherein adjusting the cache slot allocations comprises setting board-level distributions of the mirrored and unmirrored cache portions and setting board-level quantities of cache slots allocated to the cache segments to satisfy requirements of the system-level cache layout distribution model.

12. The apparatus of claim 11, further configured to:
divide the global memory into one or more cache segments.

13. The apparatus of claim 12, further configured to:
establish a cache slot size corresponding to each cache segment.

14. The apparatus of claim 13, further configured to:
allocate a first portion of the global memory for mirrored cache segments; and
allocate a second portion of the global memory for unmirrored cache segments.

15. The apparatus of claim 14, further configured to:
analyze the IO workload; and
identify the one or more characteristics of the IO workload based on the analysis.

16. The apparatus of claim 15, further configured to:
determine one or more of an IO type, IO size, IO pattern, IO sequence, and IOs per second (IOPS) corresponding to the IO workload.

17. The apparatus of claim 16, further configured to:
establish one or more IO workload models based on the one or more characteristics of one or more historical IO workloads.

18. The apparatus of claim 17, further configured to:
dynamically adjust cache slot allocations for each cache segment of the global memory based on the one or more IO workload models.

19. The apparatus of claim 17, further configured to:
increase cache slot allocations of one or more subject cache segments of the global memory based on the one or more IO workload models.

20. The apparatus of claim 17, further configured to:
decrease cache slot allocations of one or more subject cache segments of the global memory based on the one or more IO workload models.

* * * * *